US008688356B2

(12) United States Patent
Watanabe et al.

(10) Patent No.: US 8,688,356 B2
(45) Date of Patent: Apr. 1, 2014

(54) CONTROL DEVICE FOR INTERNAL COMBUSTION ENGINE

(75) Inventors: Hideto Watanabe, Toyota (JP); Taku Harada, Toyota (JP); Yasuo Shimizu, Nagoya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 1501 days.

(21) Appl. No.: 11/792,313

(22) PCT Filed: Nov. 13, 2006

(86) PCT No.: PCT/JP2006/023051
§ 371 (c)(1),
(2), (4) Date: Jun. 5, 2007

(87) PCT Pub. No.: WO2007/055424
PCT Pub. Date: May 18, 2007

(65) Prior Publication Data
US 2011/0118951 A1    May 19, 2011

(30) Foreign Application Priority Data

Nov. 14, 2005  (JP) .................... 2005-328897
Nov. 9, 2006   (JP) .................... 2006-303900

(51) Int. Cl.
*G06F 19/00* (2011.01)
(52) U.S. Cl.
USPC ........................................ 701/111
(58) Field of Classification Search
USPC .................. 701/101–105, 111, 112
See application file for complete search history.

(56) References Cited

U.S. PATENT DOCUMENTS

| 5,577,476 | A  | * | 11/1996 | Iyoda ...................... 123/406.33 |
| 5,752,492 | A  | * | 5/1998  | Kato et al. ..................... 123/674 |
| 5,765,372 | A  | * | 6/1998  | Mitobe et al. .................. 60/301 |
| 5,775,298 | A  | * | 7/1998  | Haller ...................... 123/406.27 |
| 6,550,319 | B1 | * | 4/2003  | Rutkowski et al. ......... 73/114.32 |
| 2003/0183195 | A1 | * | 10/2003 | Uchida et al. ............ 123/406.33 |
| 2004/0084017 | A1 | * | 5/2004  | Viele et al. ............... 123/406.14 |

FOREIGN PATENT DOCUMENTS

| EP | 1 079 088 A2 | 2/2001 |
| EP | 1 519 019 A1 | 3/2005 |
| GB | 2 338 085 A  | 12/1999 |
| JP | 01-271638 A  | 10/1989 |
| JP | 04-272439    | 9/1992 |
| JP | 05-044560    | 2/1993 |
| JP | 08-042434    | 2/1996 |
| JP | 08-312430 A  | 11/1996 |
| JP | 09-317525 A  | 12/1997 |
| JP | 2004-239198 A | 8/2004 |

* cited by examiner

*Primary Examiner* — Behrang Badii
*Assistant Examiner* — Daniel L Greene
(74) *Attorney, Agent, or Firm* — Kenyon & Kenyon LLP

(57) ABSTRACT

When the variation of the knock control system learning value is large, an idle speed learning control is performed in a learning acceleration mode. In this mode, the idle speed learning update increases and idle speed learning is performed at a high speed. By performing the idle speed learning in the learning acceleration mode, the idle speed learning can immediately follow large variations of the knock control system learning value. Accordingly, the idle speed learning control performed during idling of a hybrid car can be completed in a short time, and fuel consumption during idling can be reduced.

4 Claims, 5 Drawing Sheets

F I G. 1
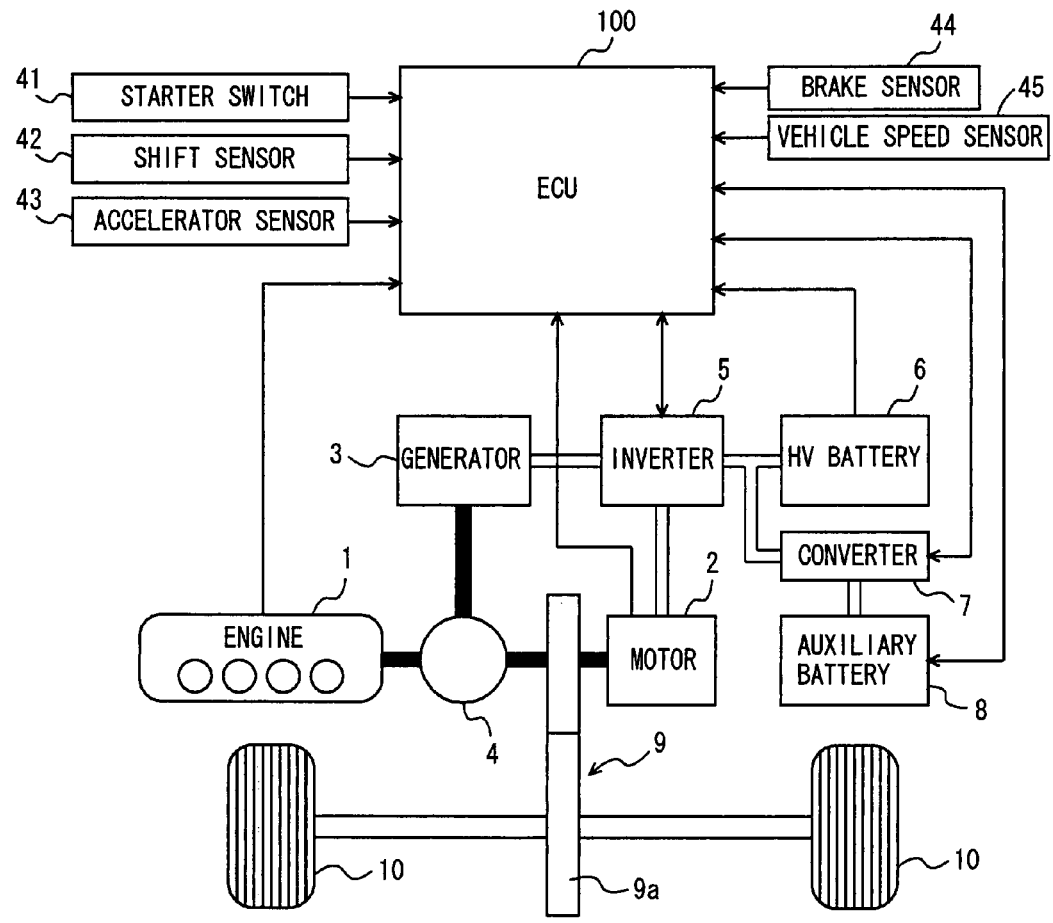

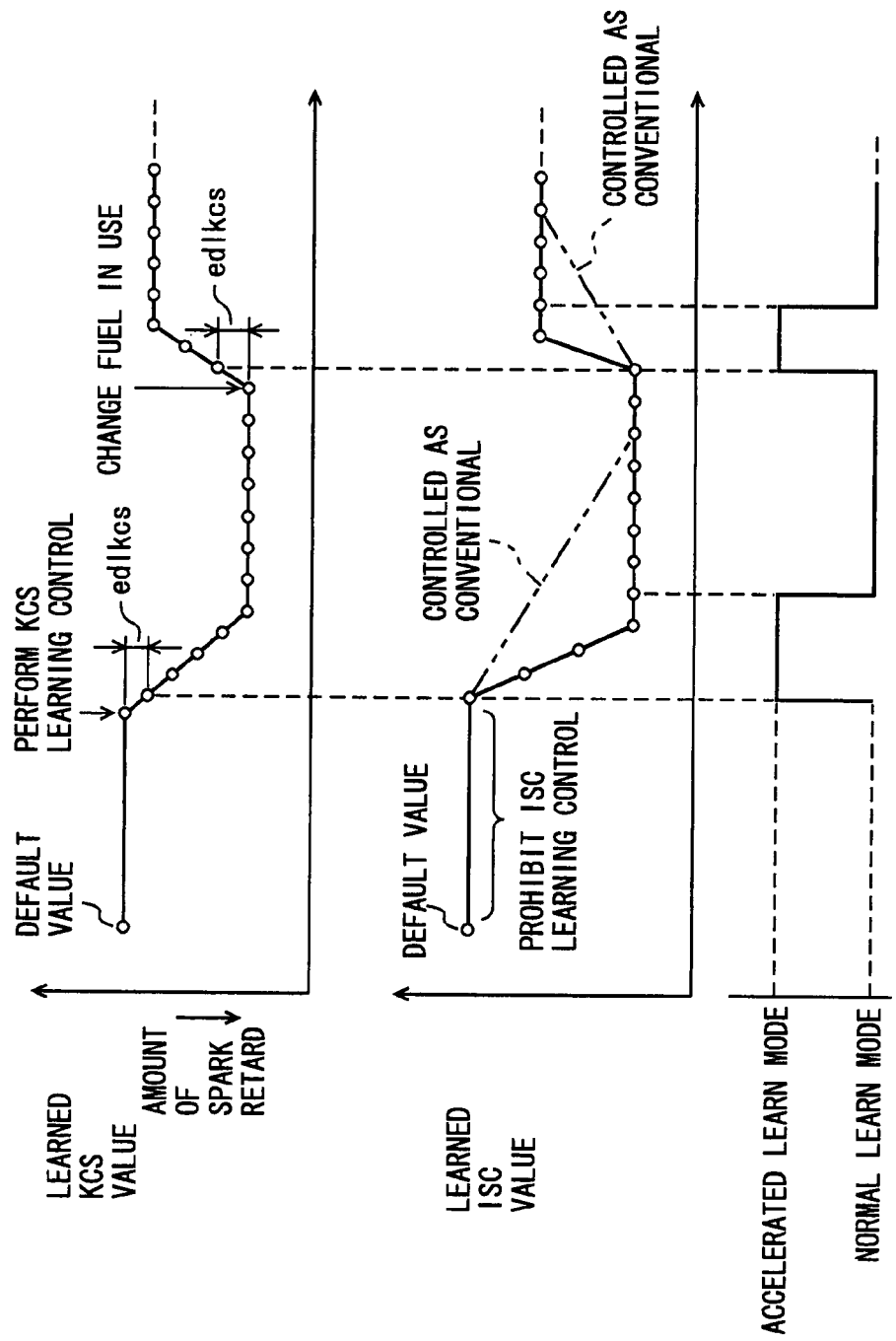

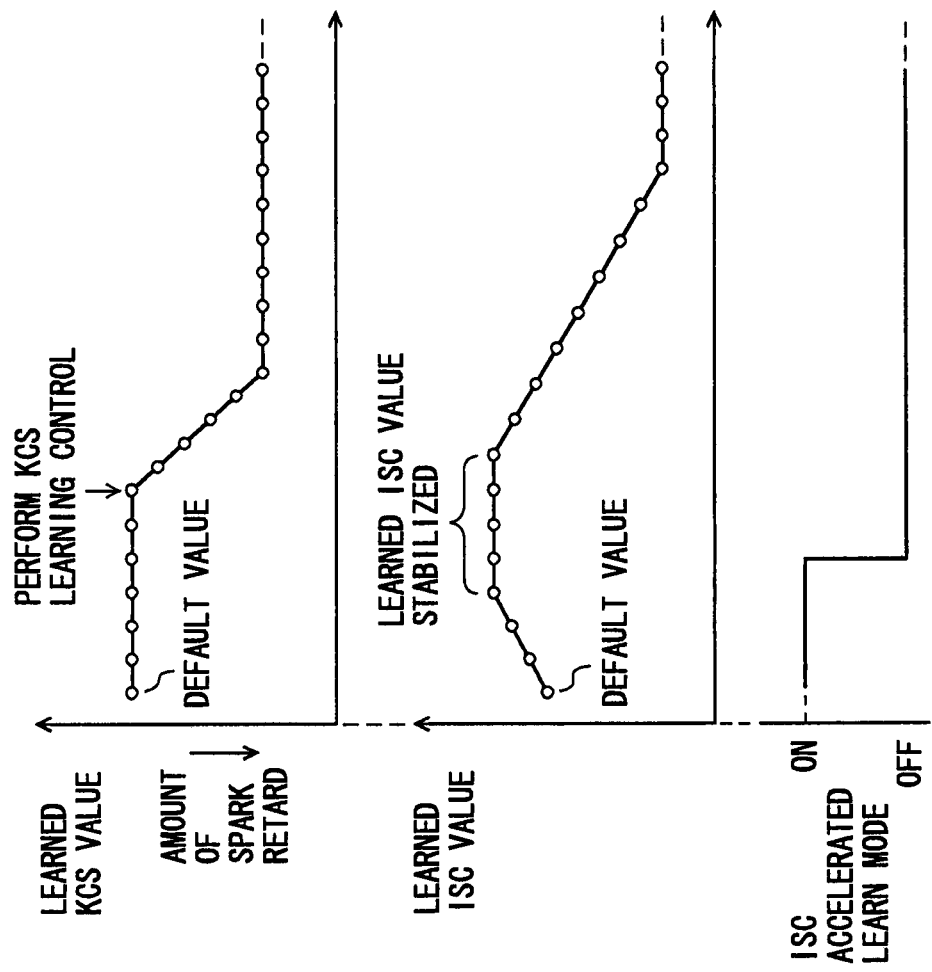

CONTROL DEVICE FOR INTERNAL COMBUSTION ENGINE

This is a 371 national phase application of PCT/JP2006/323051 filed 13 Nov. 2006, which claims priority of Japanese Patent Applications No. 2005-328897 filed 14 Nov. 2005, and No. 2006-303900 filed 9 Nov. 2006, respectively, the contents of which are incorporated herein by reference.

FIELD OF THE INVENTION

The present invention relates to control devices for internal combustion engines, that provide idle speed learning control and knock learning control to minimize or prevent knocking in internal combustion engines mounted in hybrid vehicles and other similar automobiles.

BACKGROUND OF THE INVENTION

In recent years there is a need in view of environmentalism for reduced emissions from and improved fuel economy of internal combustion engines (hereinafter also referred to as engines) mounted in automobiles, and as an automobile that satisfies such need, a hybrid vehicle having a hybrid system mounted therein is practically utilized. In hybrid vehicles, idle stop control is adopted to improve fuel economy and reduce emissions. More specifically, if a hybrid vehicle stops at an intersection to wait at traffic lights, and a predetermined condition is also, simultaneously established, the fuel supplied to the combustion chamber of the engine is cut to stop the engine.

On the other hand, an engine mounted in a hybrid vehicle or a similar automobile is controlled in idle speed by a method as follows: a bypass that bypasses a throttle valve is provided at an intake air path of the engine and an idle speed control valve (ISCV) that adjusts an air flow rate in the bypass is provided to control the ISCV in angle through feedback to match actual idle speed to a target idle speed. Furthermore, recently, there is also adopted a method in which neither the bypass nor the ISCV is provided and instead an electronically controlled throttle valve is provided at an intake air path of an engine and adjusted in angle to control idle speed to match actual idle speed to a target idle speed.

In such idle speed control, a learning control is provided. More specifically, an amount of intake air that corresponds to an angle of the throttle valve (or ISCV) that matches actual idle speed to a target idle speed is learned as a learned ISC value (a feedback control value) which is in turn reflected in the throttle valve's angle. Hereinafter such learning control will also be referred to as ISC learning control. Furthermore in ISC learning control when a learned ISC value is an initially learned value, ISC learning control is performed in an accelerated learn mode that allows ISC learning to be increased in speed (or amount and frequency), as shown in FIG. 5, and when the learned ISC value enters the range of an extent and has thus stabilized, the accelerated learn mode is set off to switch learn modes.

Furthermore, in an engine mounted in an automobile, spark timing control is provided by a knock control system (KCS) that minimizes or prevents knocking. The spark timing control by the KCS is provided as follows: A decision is made from a signal output from a knock sensor on whether the engine knocks or not, and in accordance with the decision a spark retard is introduced with respect to a reference spark timing to combust an air fuel mixture at a reduced speed to provide a reduced, low maximum combustion pressure to minimize or prevent knocking. If a decision is made that the engine does not knock, a gradual spark advance is introduced to control and thus optimize a spark timing. Note that whenever the KCS exerts spark timing control to introduce a spark retard, the amount of the spark retard is learned as a KCS value as well. Hereinafter such learning control will also be referred to as KCS learning control. Note that an amount of spark retard is an amount that is learned to provide a spark retard when an engine knocks and provide a gradual spark advance when the engine does not knock.

Techniques relevant to such ISC learning control and KCS learning control as above are described in Japanese Patent Laying-open Nos. 4-272439 (Document 1), 5-044560 (Document 2), and 8-042434 (Document 3). Document 1 describes changing an ISC controlled target idle speed in accordance with heaviness detected by a fuel property detection sensor. Document 2 describes that when feeding fuel significantly varies gasoline in volatility, a learned air fuel ratio value is updated at an increased rate to prevent excessive overrich and overlean air fuel ratios immediately after fuel is fed. Document 3 describes that a property (octane number) of the fuel that is used is determined from a knocking control value assumed at a time of spark, and a learned knocking value, and in accordance with such decision a reference spark timing for operation at idle is set.

If in a hybrid vehicle that provides ISC learning control and KCS learning control for its engine an auxiliary battery has a terminal disconnected, a battery is exchanged, an electronic control unit (ECU) is exchanged, or the like, i.e., if electrical power fed from the auxiliary battery to the ECU is interrupted, which will also be referred to hereinafter as "battery clear", then the learned ISC value and learned KCS value stored in memory internal to the ECU are initialized.

If after such "battery clear" the auxiliary battery is connected and the engine's operation is resumed both at idle and with a load, then ISC learning control and KCS learning control are performed without a problem and a learned ISC value and a learned KCS value are updated from their default (or initial) values. There is a case, however, in which after the auxiliary battery is connected, the engine is operated only at idle, and for a period of time it is not operated with a load. For example if a hybrid vehicle which has its engine in poor condition or is to undergo a simple inspection is passed to a car dealer for inspection, and the auxiliary battery has the terminal disconnected and again connected and thus resumes feeding electrical power, the car dealer then may only operate the engine at idle for inspection. Accordingly after the inspection before the user of the vehicle actually drives it the engine may not be operated with a load. In such a situation, while ISC learning control may proceed, KCS learning control may not, and in such a condition, the engine races, fails to satisfactorily start, provides poor fuel economy attributed to an increased amount of fuel when the engine is operated at idle.

Furthermore in an engine that provides ISC learning control and KCS learning control an amount of intake air also varies depending on a learned KCS value. Accordingly for example if regular gasoline is switched to high octane gasoline (or vise versa), and as a result the current octane number has varied and accordingly a learned KCS value has significantly varied, then a large discrepancy would be introduced between the learned ISC value as controlled and the actual amount of intake air and thus invite a poor state of operation. Furthermore, if a learned KCS value significantly varies, ISC learning control is also negatively affected, as will be described hereinafter.

Initially, as shown in FIG. 5, ISC learning control is performed from an initial state, with an auxiliary battery connected, in the accelerated learn mode. There is a case, however, in which before KCS learning control is performed a learned ISC value may stabilize and the accelerated learn mode may be set off. If the accelerated learn mode is thus set off, i.e., ISC learning is updated in a small amount, and a learned KCS value significantly varies, then ISC learning control cannot follow immediately, and a disadvantageously long period of time is required (or the learning needs to be done a disadvantageously large number of times) before an optimum, converged learned ISC value is obtained. In particular, if for increased fuel economy and reduced emissions a hybrid vehicle has its engine automatically stopped when a condition for stopping the engine is established, i.e., if idle stop is introduced in the vehicle, and for the above ground there is a long period of time before idle learning control completes, then the effect that idle stop has to enhance fuel economy is disadvantageously reduced.

SUMMARY OF THE INVENTION

To achieve the above object the present invention provides a control device for an internal combustion engine, including: an idle speed learning control unit for learning an amount of intake air to match an actual idle speed to a target idle speed when the internal combustion engine is operated at idle; and a knock learning control unit for making a decision on whether the internal combustion engine knocks, and learning a spark timing, as based on the decision, as a learned knock value. The spark timing allows knocking to be minimized/prevented. The idle speed learning control unit is characterized in that the unit has an accelerated learn mode set therein to increase a learning speed and if the learned knock value learned by the knock learning control unit has a variation having at least a predetermined value, the unit learns the amount of intake air in the accelerated learn mode.

In accordance with the present invention when a learned KCS value has a large variation, ISC learning control is performed in an accelerated learn mode allowing ISC learning to be updated in a large amount and fast performed. ISC learning control thus performed in the accelerated learn mode allowing ISC learning to be fast performed can immediately follow the large variation of the learned KCS value and thus allows a learned ISC value to converge to an optimum learned ISC value in a reduced period of time. This can prevent the internal combustion engine from racing, unsatisfactorily starting, and the like. Furthermore, it also allows ISC learning control performed in a hybrid vehicle at idle to be completed in a short period of time to allow idle stop to more effectively enhance fuel economy.

In the present invention when the learned knock value learned by the knock learning control unit has a variation having at least the predetermined value, a learned value of the amount of intake air may be corrected in accordance with the learned knock value and the amount of intake air may then be learned in the accelerated learn mode. By adopting such configuration, a learned ISC value can be corrected in accordance with a learned KCS value to allow an amount of intake air to approach a target value, and in that condition, ISC learning control can be performed in the accelerated learn mode. The learned ISC value can thus converge to an optimum ISC value in a further reduced period of time.

Furthermore, to achieve the above object, the present invention provides a control device for an internal combustion engine, including: an idle speed learning control unit for learning an amount of intake air to match an actual idle speed to a target idle speed when the internal combustion engine is operated at idle; and a knock learning control unit for making a decision on whether the internal combustion engine knocks, and learning a spark timing, as based on the decision, as a learned knock value. The spark timing allows knocking to be minimized/prevented. The idle speed learning control unit is characterized in that if the learned knock value learned by the knock learning control unit has a variation having at least a predetermined value, the unit corrects a learned value of the amount of intake air in accordance with the learned knock value.

The present invention also allows ISC learning control to immediately follow a large variation of a learned KCS value. More specifically, the fact that an amount of intake air varies depending on a learned KCS value is utilized and in accordance with a relationship between the amount of intake air and the learned KCS value a learned ISC value as controlled is corrected to resolve a deviation between the learned ISC value and an actual amount of intake air so that if the learned KCS value has a large variation, ISC learning control can immediately follow and the learned ISC value can converge to an optimum learned ISC value in a short period of time.

In accordance with the present invention if a learned KCS value has a large variation, ISC learning control can immediately follow and thus allows a learned ISC value to converge to an optimum learned ISC value in a short period of time. This allows ISC learning control performed for example in a hybrid vehicle at idle to be completed in a short period of time to allow idle stop to more effectively enhance fuel economy.

BRIEF DESCRIPTION OF THE DRAWINGS

FIG. 1 schematically shows a configuration of one example of a hybrid vehicle to which a control device for an internal combustion engine of the present invention is applied.

FIG. 4 is timing plots representing how a learned ISC value and a learned KCS value vary.

FIG. 5 illustrates a disadvantage of conventional ISC learning control and KCS learning control.

DETAILED DESCRIPTION

Figure 2:
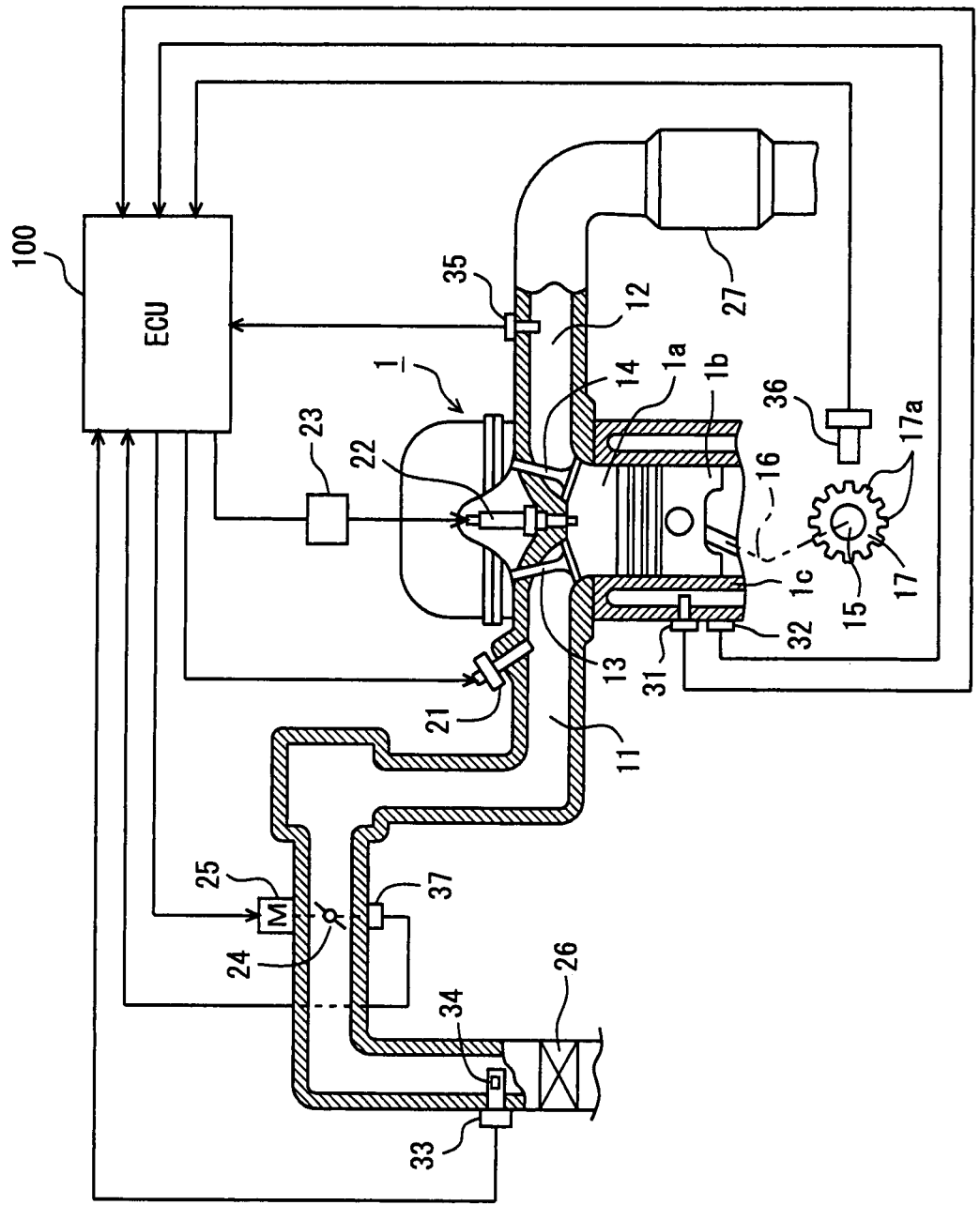
FIG. 2 schematically shows a configuration of an engine (or internal combustion engine) mounted in the hybrid vehicle of FIG. 1.

Hereinafter an embodiment of the present invention will be described with reference to the drawings.

FIG. 1 schematically shows a configuration of one example of a hybrid vehicle to which a control device for an internal combustion engine of the present invention is applied.

The hybrid vehicle shown in FIG. 1 includes an engine 1, a motor 2, a generator 3, a power split device 4, an inverter 5, an HV battery 6, a converter 7, an auxiliary battery 8, a transmission 9, and an ECU 100.

Engine 1 is a 4-cylinder gasoline engine and, as shown in FIG. 2, includes a piston 1*b* defining a combustion chamber 1*a* and a crankshaft 15 severing as an output shaft. Piston 1*b* is linked via a connecting rod 16 to crankshaft 15, and the reciprocation of piston 1*b* is converted by connecting rod 16 to the rotation of crankshaft 15.

To crankshaft 15 a signal rotor 17 is attached. Signal rotor 17 circumferentially has a plurality of protrusions (or teeth) 17*a*. Signal rotor 17 is adjacent to a crank position sensor 36 implemented for example by an electromagnetic pickup and generating a pulsing signal (an output pulse) corresponding to protrusion 17*a* of signal rotor 17 as crankshaft 15 rotates.

In engine 1 combustion chamber 1a has a spark plug 22 therein. Spark plug 22 is timed, as adjusted by an igniter 23, to ignite. Igniter 23 is controlled by ECU 100, which will be described later.

Engine 1 has a cylinder block 1c, which is provided with a coolant temperature sensor 31 detecting the temperature of a coolant of the engine, and a knock sensor 32. Knock sensor 32 detects the engine's vibration transmitted to cylinder block 1c of engine 1. Knock sensor 32 is implemented for example by a flat sensor (a non-resonant knock sensor), and it has a generally flat output characteristic over a wide frequency range of the vibration of the engine.

In engine 1 combustion chamber 1a is connected to an intake path 11 and an exhaust path 12. Between intake path 11 and combustion chamber 1a an intake valve 13 is disposed. Intake valve 13 is driven to open and close to allow intake path 11 to communicate with and be disconnected from combustion chamber 1a, respectively. Furthermore between exhaust path 12 and combustion chamber 1a an exhaust valve 14 is disposed. Exhaust valve 14 is driven to open and close to allow exhaust path 12 to communicate with and be disconnected from combustion chamber 1a, respectively. Intake valve 13 and exhaust valve 14 are opened and closed, as driven by the rotation of each of an intake camshaft and an exhaust camshaft to which the rotation of crankshaft 15 is transmitted.

Intake path 11 is provided with an air cleaner 26, a hot wire air flow meter 33, an intake air temperature sensor 34, which is incorporated in hot wire air flow meter 33, and an electronically controlled throttle valve 24 adjusting an amount of intake air of engine 1. Throttle valve 24 is driven by a throttle motor 25. The angle of throttle valve 24 is detected by a throttle sensor 37. In engine 1 exhaust path 12 is provided with an $O_2$ sensor detecting the concentration of oxygen in emissions, a ternary catalyst 27, and the like.

Intake path 11 is provided with a fuel injector (a fuel injection valve) 21 receiving fuel of a predetermined pressure from a fuel tank by a fuel pump to inject the fuel into intake path 11. The injected fuel is mixed with intake air to provide an air fuel mixture which is in turn introduced into combustion chamber 1a of engine 1 and ignited by spark plug 22 for combustion and explosion. As the air fuel mixture is combusted and exploded in combustion chamber 1a, piston 1b reciprocates and crankshaft 15 rotates. The operation of engine 1 as described above is controlled in state by ECU 100.

Motor 2 is an alternate current synchronous electric motor having a rotor rotated by a 3-phase alternate current to generate motive power. Motor 2 rotates as it receives alternate current electrical power obtained by converting the direct current electrical power of HV battery 6 by inverter 5. Note that motor 2, in deceleration and braking, regeneratively generates electrical power.

Generator 3, as well as motor 2, is an alternate current synchronous electric motor. Of the motive power generated by engine 1, that distributed via power split device 4 drives generator 3 to generate alternate current electrical power which is in turn converted by inverter 5 to direct current electrical power and thus charges HV battery 6.

Motor 2 and generator 3 are driven as controlled by ECU 100. ECU 100 receives from motor 2 and generator 3 a signal (e.g., speed, a current applied, and the like) required to control motor 2 and generator 3 to drive them, and outputs a switching control signal to inverter 5.

Power split device 4 is for example a planetary gear configured of a ring gear coupled to a shaft of rotation of motor 2, a sun gear coupled to a shaft of rotation of generator 3, and a carrier coupled to an output shaft of engine 1. Power split device 4 splits the motive power of engine 1 for the shaft of rotation of motor 2, which is linked to a driving wheel 10, and the shaft of rotation of generator 3.

HV battery 6 is a high voltage battery that is configured for example of a predetermined number of nickel metal hydride battery cells connected in series. As has been described previously, it is charged with electrical power generated by generator 3. HV battery 6 is monitored by ECU 100.

Inverter 5 is an electrical power conversion device providing conversion between the direct current of HV battery 6 and the 3-phase alternate current of motor 2, generator 3, and the like. Inverter 5 is controlled by ECU 100.

Auxiliary battery 8 supplies illumination equipment, audio equipment, a compressor for an air conditioner, ECU 100 and the like with electrical power. Auxiliary battery 8 is monitored by ECU 100. Note that when electrical power fed from auxiliary battery 8 is interrupted, ECU 100 sets a "battery clear" history flag on.

Converter 7 is a DC-DC converter connected to that side of inverter 5 which is associated with direct current to down-convert a direct current of high voltage to a low voltage (for example of 12 V) to charge auxiliary battery 8.

Transmission 9 is a mechanism transmitting via a differential portion 9a to driving wheel 10 the motive power split by power split device 4 toward driving wheel 10. Transmission 9 is configured such that automatic transmission fluid (ATF) is circulated therein for lubrication.

ECU 100 is equipped with a CPU, a ROM, a RAM, a backup RAM, and the like. The ROM has various types of control programs, a map referenced in executing the various types of control programs, and the like stored therein. The CPU performs various types of operation processes as based on the various types of control programs, map and the like stored in the ROM. The RAM is a memory temporarily storing a result of an operation performed in the CPU, data received from each sensor, and the like. The backup RAM is a non volatile memory storing data to be stored for example when engine 1 stops, and the like.

ECU 100 is connected to coolant temperature sensor 31, knock sensor 32, air flow meter 33, intake air temperature sensor 34, $O_2$ sensor 35, crank position sensor 36, and throttle sensor 37, and furthermore to a starter switch 41, a shift sensor 42 detecting a position at which the shift lever is operated, an accelerator pedal position sensor 42 detecting the position of the accelerator pedal, a brake sensor 44, a vehicle speed sensor 45, and the like.

ECU 100 exerts hybrid control. More specifically, ECU 100 calculates a torque requested by the driver, an engine output required, a motor torque and the like, as based on signals output from the aforementioned, various types of sensors, and drives driving wheel 10 with one or both of engine 1 and motor 2 serving as a source(s) of motive power. For example for a range with low engine efficiency, such as when a vehicle drives off or runs at low speed, ECU 100 exerts control to stop engine 1, and operate motor 2 to alone provide motive power to drive driving wheel 10. When the vehicle normally runs, ECU 100 exerts control to operate engine 1 to provide motive power to drive driving wheel 10. Furthermore, when the vehicle is accelerated at full throttle or similarly runs with a large load, ECU 100 exerts control to operate engine 1 to provide motive power, and in addition allow HV battery 6 to supply motor 2 with electrical power to allow motor 2 to provide motive power added as assistive motive power.

Furthermore, when a condition for stopping the engine is established, ECU 100 exerts idle stop control to automatically stop engine 1, and performs ISC learning control and KCS learning control as described below:

—ISC Learning Control—

ISC learning control is provided when engine 1 is operated at idle. More specifically, throttle valve 24 is adjusted in angle to control through feedback an amount of intake air introduced into engine 1 to match actual idle speed to a target idle speed when the engine is operated at idle, and the amount of intake air (i.e., the angle of throttle valve 24) is also learned.

More specifically, coolant temperature sensor 31 outputs a signal indicating the current temperature of the coolant of the engine. In accordance with the temperature a preset map is referenced to calculate a target idle speed. Furthermore, actual idle speed (i.e., engine speed) is read from a signal output from crank position sensor 36, and throttle valve 24 is controlled in angle to control through feedback an amount of intake air introduced into engine 1 to match the actual idle speed to the target idle speed. Furthermore, the amount of intake air corresponding to the angle of throttle valve 24 is learned as an ISC value and thus stored to the RAM, the backup RAM and the like. Furthermore in this example there are set an accelerated learn mode allowing ISC learning to be updated in a large amount (or allowing a large learning gain) to perform ISC learning fast, and a normal learn mode allowing ISC learning to be updated only in a limited amount to decrease the learning in speed (or amount and frequency).

—KCS Learning Control—

KCS learning control minimizes or prevents knocking of engine 1. More specifically, a decision on whether the engine knocks or not is made from a signal output from knock sensor 32, and in accordance with the decision a spark retard is introduced with respect to a reference spark timing. Furthermore, the amount of the spark retard, or a KCS value, is also learned.

More specifically, crank position sensor 36 outputs a signal indicating engine speed and air flow meter 33 outputs a signal indicating an amount of intake air. In accordance with the output signals a preset map is referenced to calculate a reference spark timing. Furthermore, a peak value of a knock signal received from knock sensor 32 is compared with a knock reference level to determine whether the engine knocks. If a decision is made that the engine knocks, a spark retard is introduced with respect to the reference spark timing to combust an air fuel mixture at a reduced speed to provide a reduced, low maximum combustion pressure to minimize or prevent knocking. Furthermore the amount of the spark retard is learned as a KCS value and thus stored to the RAM, the backup RAM and the like. Note that an amount of spark retard is an amount that is learned to provide a spark retard when an engine knocks and provide a gradual spark advance when the engine does not knock.

If the hybrid vehicle providing ISC learning control and KCS learning control, as described above, has "battery clear" as has been previously described, and auxiliary battery 8 is subsequently connected and engine 1 having its operation resumed is operated both at idle and with a load, then ISC learning control and KCS learning control are performed without a problem and a learned ISC value and a learned KCS value are updated from their default (or initial) values.

However, if the engine after auxiliary battery 8 is connected is operated only at idle, and for a period of time it is not operated with a load, then, ISC learning control is alone performed from an initial state, with the auxiliary battery connected, in the accelerated learn mode, and before KCS learning control is performed a learned ISC value stabilizes and the accelerated learn mode is set off (see FIG. 5). If in such a condition, KCS learning control is performed and a learned KCS value significantly varies, then, ISC learning control cannot follow immediately, and a disadvantageously long period of time is required (or the learning needs to be done a disadvantageously large number of times) before an optimum, converged learned ISC value is obtained. Furthermore if a stabilized learned KCS value obtained as KCS learning control is performed is significantly varied as the fuel in use is changed (i.e., an octane number has varied), ISC learning control also cannot follow immediately, and a disadvantageously long period of time is required before an optimum, converged learned ISC value is obtained.

Figure 3:
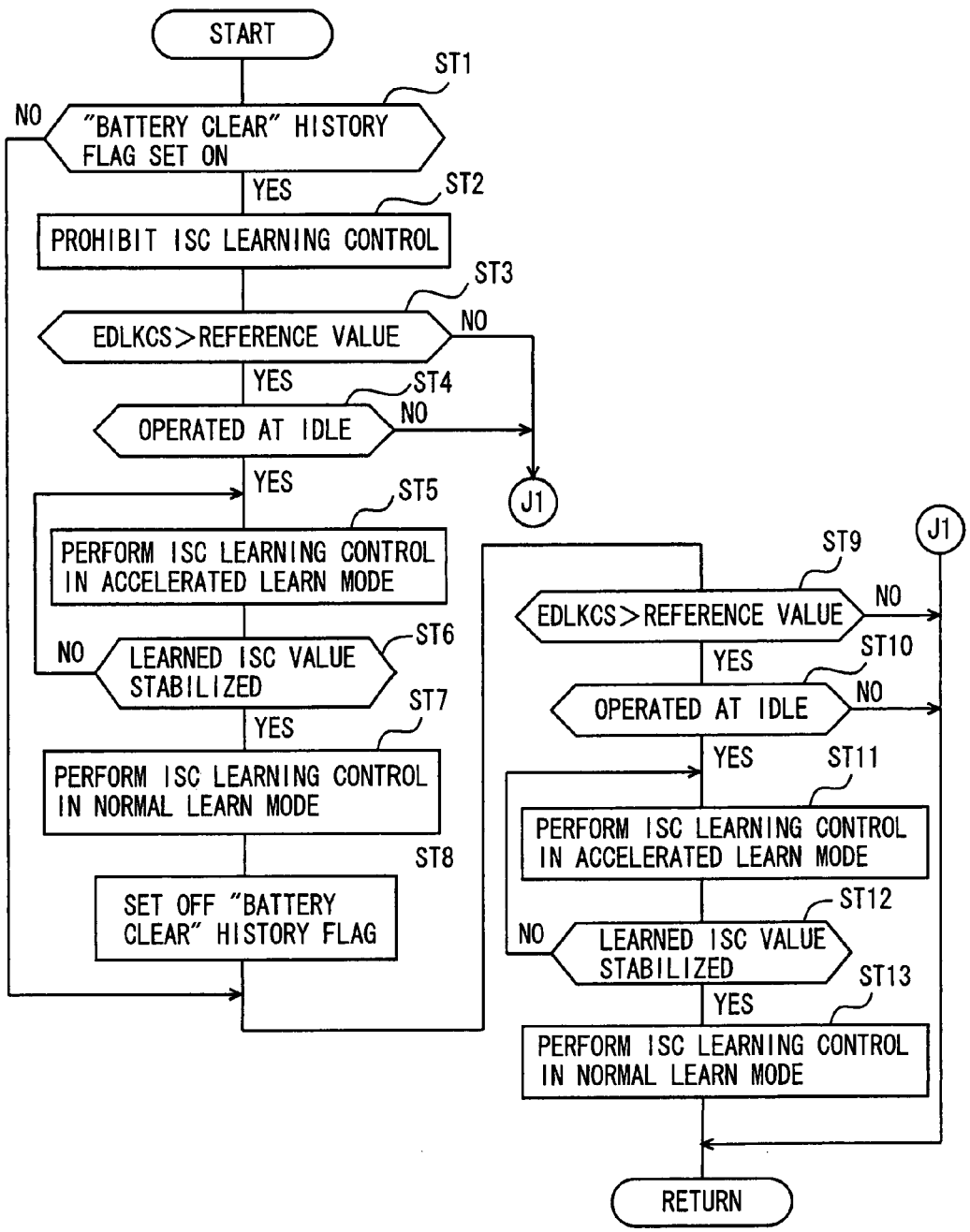
FIG. 3 is a flowchart of one example of ISC learning control and KCS learning control provided by an ECU.

To address such disadvantage this example is characterized in that if a learned KCS value significantly varies, ISC learning control is provided in the accelerated learn mode to allow ISC learning control to follow the variation of the learned KCS value. A specific example of such control will now be described with reference to the flowchart of FIG. 3. Note that the control routine of FIG. 3 is repeated in ECU 100 for each predetermined time.

At step ST1 a decision is made on whether the "battery clear" history flag is set on. If the decision is negative, the control proceeds to step ST9. If the decision made at step ST1 is positive, the control proceeds to step ST2 to prohibit ISC learning control until KCS learning control is performed and provides a learned KCS value having a variation edlkcs equal to or larger than a predetermined reference value.

Then after auxiliary battery 8 is connected when engine 1 is first operated with a load, KCS learning control is performed to learn a KCS value. If the learned KCS value varies and its variation edlkcs attains a value equal to or larger than the predetermined reference value (i.e., if at step ST3 a positive decision is made), the control proceeds to step ST4, and when engine 1 is operated at idle, ISC learning control is performed in the accelerated learn mode (step ST5).

Hereinafter steps ST1-ST5 will more specifically be described. Initially, after "battery clear," auxiliary battery 8 is connected and the operation of engine 1 is resumed. If in doing so the engine is only operated at idle and not operated with a load, then, as shown in FIG. 4, KCS learning control is not performed and for the current learned KCS value a default value is maintained. When KCS learning control is thus not performed, ISC learning control is prohibited in step ST2 to prevent ISC learning control from proceeding.

Then if engine 1 is first operated with a load and KCS learning control is performed, the learned KCS value varies significantly from the default value and provides variation edlkcs attaining a value equal to or larger than the predetermined reference value. If the learned KCS value thus has variation edlkcs equal to or larger than the predetermined reference value, ISC learning control is performed in the accelerated learn mode (steps ST4 and ST5). This allows ISC learning control to immediately follow a large variation of the learned KCS value, and, as shown in FIG. 4, a learned ISC value to converge to an optimum learned value in a shorter period of time (or the learning to be done advantageously less frequently) than when conventional control is exerted as indicated in FIG. 4 by a chained, double dashed line.

When ISC learning control in the accelerated learn mode achieves a stabilized learned ISC value, the current ISC learn mode is switched to the normal learn mode, and in that mode, ISC learning control is performed (steps ST6 and ST7). Note that at step ST6 whether a learned ISC value is stabilized is determined by whether the learned ISC value has a variation falling within a predetermined range. Thereafter at step ST8 the "battery clear" history flag is set off and the control proceeds to step ST9.

By the above process performed after the "battery clear," ISC learning control is performed in the normal learn mode, and KCS learning control is also performed in order repeatedly. This allows a learned ISC value and a learned KCS value to both transition in a stable manner.

If in such condition the fuel in use is changed, i.e., regular gasoline is switched to high octane gasoline (or vice versa), the current octane number varies and accordingly the learned KCS value significantly varies and provides variation edlkcs attaining a value equal to or larger than the predetermined reference value. If the learned KCS value thus provides variation edlkcs attaining a value equal to or larger than the predetermined reference value (i.e., if at step ST9 a positive decision is made), then, ISC learning control is performed in the accelerated learn mode when engine 1 is operated at idle (steps ST10 and ST11). Thus if an octane number varies and accordingly a learned KCS value significantly varies, ISC learning control can be performed in the accelerated learn mode to immediately follow the significant variation of the learned KCS value and, as shown in FIG. 4, allow a learned ISC value to converge to an optimum learned value in a shorter period of time (or the learning to be done advantageously less frequently) than when conventional control is exerted as indicated in figure by the chained, double dashed line.

Thereafter when ISC learning control in the accelerated learn mode achieves a stabilized learned ISC value, the current ISC learn mode is switched to the normal learn mode, and in that mode, ISC learning control is performed (steps ST12 and ST13).

Thus, as controlled in this example, if a learned KCS value provides a large variation edlkcs, ISC learning control can be performed in an accelerated learn mode allowing ISC learning to be fast performed. ISC learning control can thus immediately follow the large variation of the learned KCS value and thus allows a learned ISC value to converge to an optimum learned value in a reduced period of time. This allows ISC learning control performed in a hybrid vehicle at idle to be completed in a short period of time to allow idle stop to more effectively enhance fuel economy.

Other Embodiment

In the above example when a learned KCS value provides variation edlkcs equal to or larger than a predetermined reference value the current ISC learn mode is switched to perform ISC learning at an increased speed. Alternatively when the learned KCS value provides variation edlkcs equal to or larger than the predetermined reference value, such control that corrects a learned value of an amount of intake air in accordance with the learned KCS value may be exerted.

More specifically, such a method can be indicated as follows: the fact that an amount of intake air varies depending on a learned KCS value is utilized and in accordance with a relationship between the amount of intake air and the learned KCS value a corrected, learned ISC value that resolves a deviation between a learned ISC value as controlled and an actual amount of intake air is previously obtained empirically through experiment and calculation and the like and provided in the form of a map, and stored for example in the ROM of ECU 100. If the learned KCS value provides variation edlkcs equal to or larger than the predetermined reference value, the above correction value map is referenced to calculate a corrected value which is in turn used to correct the learned ISC value. Note that this example can be represented as shown in the FIG. 3 flowchart with steps ST5-ST7 and ST11-ST13 replaced with referencing the correction value map to calculate a corrected value and using the corrected value to correct a learned ISC value, as described above.

Furthermore, such correction process and the above described ISC learning mode switching process may be combined together and when a learned KCS value provides variation edlkcs equal to or larger than the predetermined reference value a learned value of an amount of intake air may be corrected in accordance with the learned KCS value and ISC learning control may then be performed in the accelerated learn mode. Such learning control as described above allows a learned ISC value to be corrected in accordance with a learned KCS value to allow an amount of intake air to approach a target value as controlled, before ISC learning control is performed in the accelerated learn mode. The learned ISC value can thus converge to an optimum value in a further reduced period of time.

While in the above example the present invention is applied by way of example to a hybrid vehicle provided with a discrete motor and a discrete generator, the present invention is not limited thereto. The present invention is also applicable to controlling an engine mounted in a hybrid vehicle having mounted therein a motor generator having both the function of a motor and that of a generator.

While in the above example the present invention is applied by way of example to controlling an engine mounted in a hybrid vehicle, the present invention is not limited thereto. The present invention is also applicable to an engine mounted in an economically running vehicle in which idle stop control is provided, and an engine mounted in a normal automobile in which idle stop control is not provided.

While in the above example the present invention is applied by way of example to an engine subjected to ISC learning control by adjusting in angle an electronically controlled throttle valve driven by a throttle motor, the present invention is not limited thereto. The present invention is also applicable to an engine provided with a bypass bypassing a throttle valve and an ISCV adjusting an air flow rate in the bypass, the ISCV being controlled in angle through feedback to match idle speed to a target idle speed.

While in the above example the present invention is applied by way of example to controlling a 4-cylinder engine, the present invention is not limited thereto. The present invention is also applicable for example to controlling a 6-cylinder gasoline engine and other multi-cylinder gasoline engines having any number of cylinders. Furthermore the present invention is also applicable to controlling a V-type multi-cylinder gasoline engine, a longitudinally placed, multi-cylinder gasoline engine, and the like. Furthermore the present invention is not limited to gasoline engines, and is also applicable to controlling a spark ignited engine for example employing liquefied petroleum gas (LPG), liquefied natural gas (LNG) and other types of fuel, and to controlling an in-cylinder direct injection engine.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

The invention claimed is:
1. A control device for an internal combustion engine, comprising:
   idle speed learning control device programmed to learn an amount of intake air to match an actual idle speed to a target idle speed when said internal combustion engine is operated at idle; and knock learning control device programmed to make a decision on whether said internal combustion engine knocks, and learning a spark timing, as based on said decision, as a learned knock value, said spark timing allowing knocking to be minimized/prevented, wherein, when a variation of said learned knock value is equal to or larger than a predetermined value, said idle speed learning control device is further programmed to learn said amount of intake air in an accelerated learn mode to increase a learning speed.

2. The control device for an internal combustion engine according to claim 1, wherein said idle speed learning control device is further programmed to include a device operative in response to said learned knock value learned by said knock learning control device having said variation having at least said predetermined value, for correcting a learned value of said amount of intake air in accordance with said learned knock value and then learning said amount of intake air in said accelerated learn mode.

3. A control device for an internal combustion engine, wherein said control device is programmed to learn an amount of intake air to match an actual idle speed to a target idle speed when said internal combustion engine is operated at idle, wherein said control device is further programmed to make a decision on whether said internal combustion engine knocks, and to learn a spark timing, as based on said decision, as a learned knock value, said spark timing allowing knocking to be minimized/prevented, and to learn said amount of intake air in an accelerated learn mode increasing a learning speed when a variation of said learned knock value is equal to or larger than a predetermined value.

4. The control device for an internal combustion engine according to claim 3, wherein when said amount of intake air is learned, and said learned knock value has said variation having at least said predetermined value, a learned value of said amount of intake air is corrected in accordance with said learned knock value and said amount of intake air is then learned in said accelerated learn mode.

* * * * *

UNITED STATES PATENT AND TRADEMARK OFFICE
CERTIFICATE OF CORRECTION

PATENT NO. : 8,688,356 B2
APPLICATION NO. : 11/792313
DATED : April 1, 2014
INVENTOR(S) : H. Watanabe et al.

It is certified that error appears in the above-identified patent and that said Letters Patent is hereby corrected as shown below:

On the Title Page, Item (86) "PCT No.", change "PCT No: PCT/JP2006/023051" to
-- PCT No: PCT/JP2006/323051 --.

Signed and Sealed this
Sixteenth Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,688,356 B2                                                Page 1 of 1
APPLICATION NO.  : 11/792313
DATED            : April 1, 2014
INVENTOR(S)      : Watanabe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1634 days.

Signed and Sealed this
Twenty-ninth Day of September, 2015

Michelle K. Lee
*Director of the United States Patent and Trademark Office*